Jan. 8, 1924.

C. E. COCHRAN 1,479,981

INDUSTRIAL TRUCK

Filed July 9, 1920     3 Sheets-Sheet 3

Inventor
Clyde E. Cochran,
By Bates & Macklin,
Attorneys

Patented Jan. 8, 1924.

1,479,981

UNITED STATES PATENT OFFICE.

CLYDE E. COCHRAN, OF CLEVELAND, OHIO, ASSIGNOR TO THE ELWELL-PARKER ELECTRIC COMPANY, OF CLEVELAND, OHIO, A CORPORATION OF OHIO.

INDUSTRIAL TRUCK.

Application filed July 9, 1920. Serial No. 394,932.

*To all whom it may concern:*

Be it known that I, CLYDE E. COCHRAN, a citizen of the United States, residing at Cleveland, in the county of Cuyahoga and State of Ohio, have invented a certain new and useful Improvement in Industrial Trucks, of which the following is a full, clear, and exact description, reference being had to the accompanying drawings.

This invention relates to power-operated trucks such as are commonly used in factories, warehouses, freight stations and the like. The essential object of this invention is to provide in a motor driven truck a power-operated carrying support arranged to facilitate the picking up or loading of heavy packages, boxes, bales, bundles and the like, after the manner of two-wheeled hand trucks, commonly known as "chisel-wedge hand trucks," as well as being adapted to quickly unload such packages from the support by movement thereof under control of the power-operated device.

A further object is to provide a load-lifting member pivoted adjacent the center of the truck, said load-lifting member being connected to a toggle, whereby it may be operated to swing about that pivot to accomplish the desired lifting while changing the angle of the load support but slightly. Additional objects are to so construct the truck that it may be comparatively simple, efficient and rapid in operation, and have no parts liable to get out of order.

Figure 1:
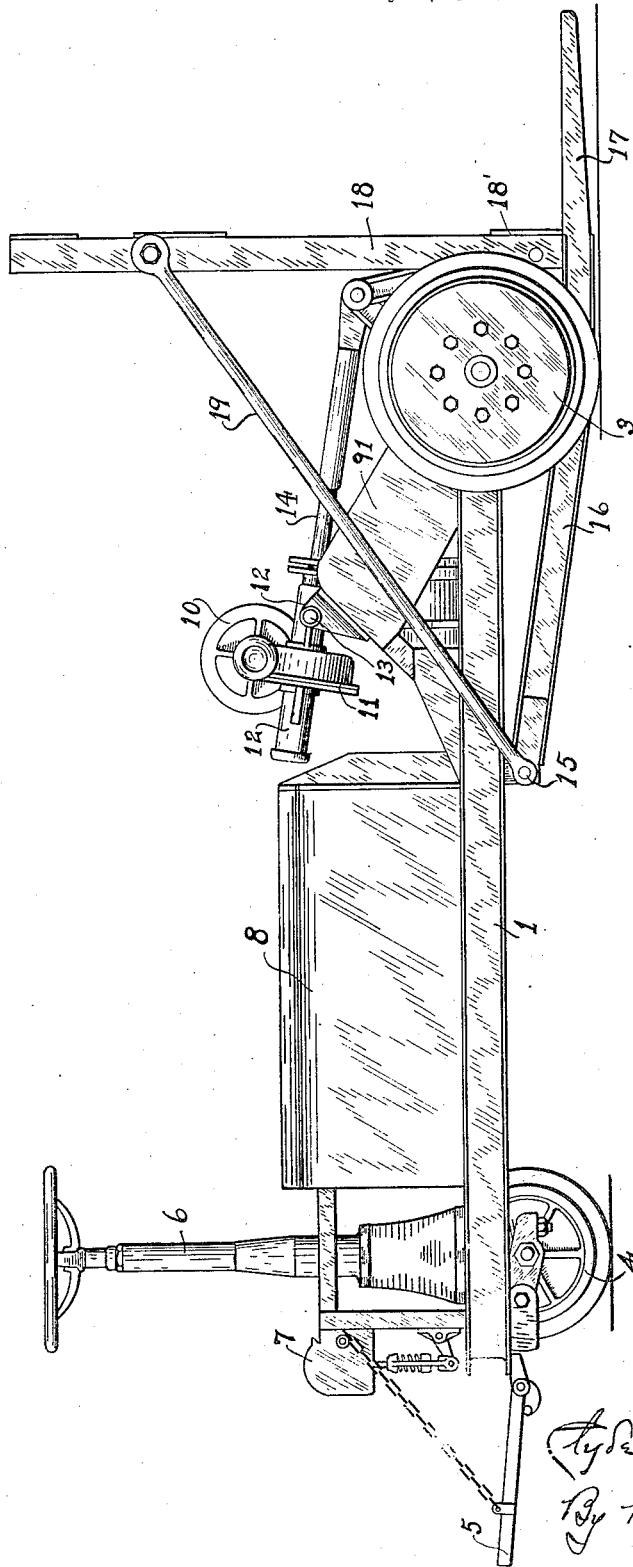
Figure 2:
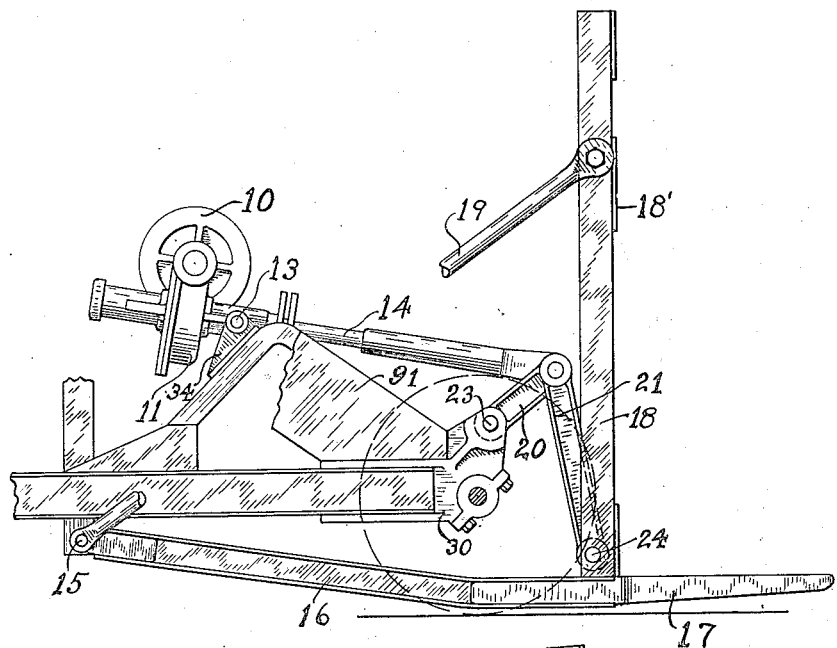
Figure 3:
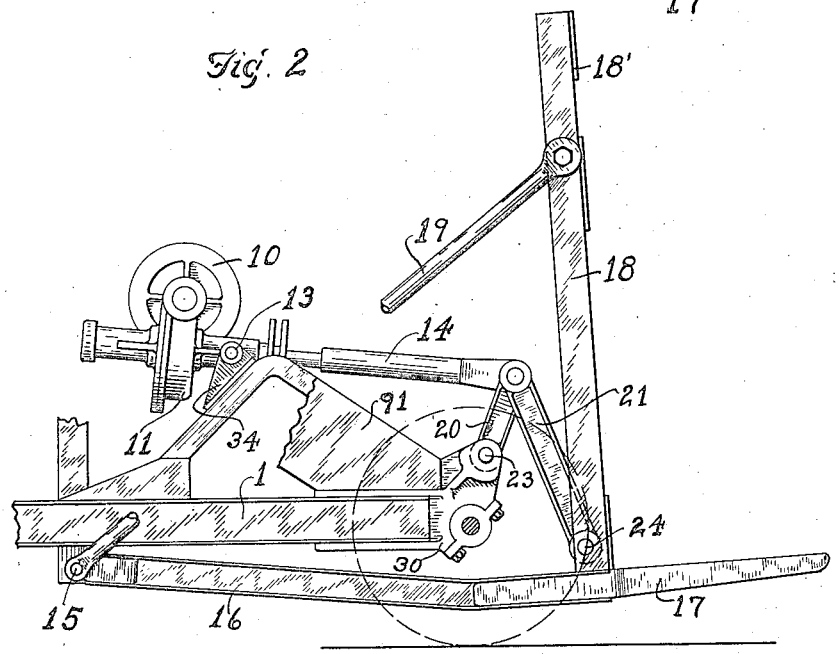
Figure 4:
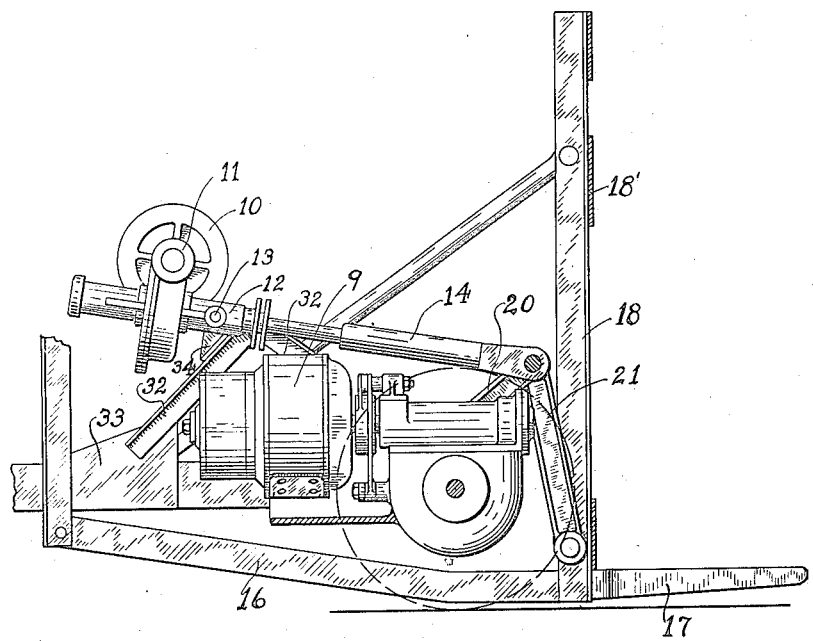
Figure 5:
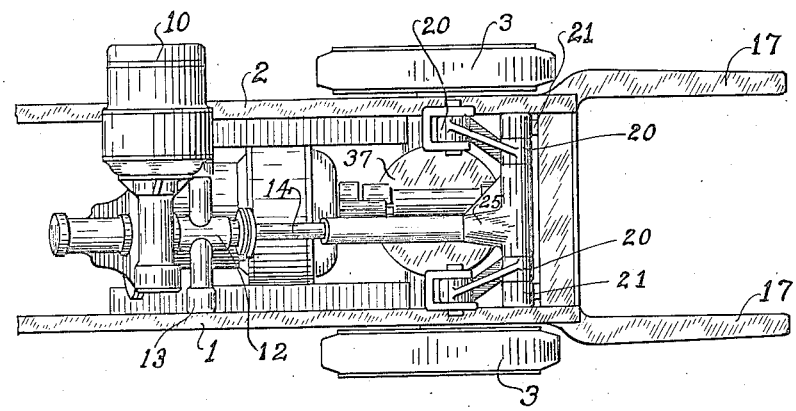

In the drawings Fig. 1 is a side elevation of a power-operated truck equipped with my invention; Fig. 2 is a side elevation showing the mechanism for raising the load; Fig. 3 is a view similar to Fig. 2, showing the position of the parts after the load is lifted; Fig. 4 is a side elevation showing the load lifting mechanism and the truck driving motor; Fig. 5 is a top plan view of the parts shown in Fig. 4.

Referring briefly to the general construction of the truck shown, which is merely illustrative of any suitable truck equipped with my invention, 1 and 2 indicate longitudinal frame members supported at their rear ends by wheels 3 and at the front by one or more wheels 4.

Arranged on the forward end of the frame members are the operator's controls including brake and controller platforms indicated at 5, and the steering mechanism is shown at 6. The control for the load lifting mechanism, to be later described, is shown at 7. A housing 8 may contain suitable batteries for driving the motor 9 enclosed in casing 91. The wheels 3 may be driven by this motor 9, suitable worm and gear or other connections being provided.

In an arrangement of truck construction such as shown, the battery may supply current to a reversible motor indicated at 10. This motor serves to move a pull rod 14 through a nut threaded onto the screw formed on the rod, the nut carrying worm teeth engaged by a worm on the armature shaft of the motor. The casing for this nut and worm is indicated at 11 and serves to enclose these parts while also acting to support the frame of the motor. Extending each way from the casing 11 are tubular bearing members through which the pull rod screw member extends, permitting longitudinal movement of this rod as the nut is rotated by the motor. This movement of the pull rod 14 operates the lifting mechanism and during such operation the rod swings with the casing and motor about a pivot, indicated at 13, carried by the supports of the housing 91. The arrangement of the driving gearing and nut connecting the motor with the pull rod is preferably as shown, described and claimed in my prior Patent No. 1,275,849, issued August 13, 1918.

Pivoted at 15 adjacent the center of the truck are shown the frame members 16, having the load carrying arms 17. Extending upwardly from the frame 16 are uprights 18 connected by crosspieces 18'. Struts 19 shown as connected to the pivot 15 serve to brace these uprights.

A toggle device comprising pairs of arms 20 and 21 connects the frame with the load lifting members and these arms are pivoted to the frame and load lifting members respectively. The pivot 23 for the arms 20 is preferably carried by a bracket 30 secured to the ends of the frame members 1 and 2, while the arms 21 are pivoted to a cross rod 24 shown as secured at its ends to the uprights 18. Pivoted connection is made between the toggle device and the rod 14, by a T shaped tubular member 25 embracing the intermediate pivot shaft extending through all of the arms 21 and 22.

The casing 91 may be supported by suitable strut members 32 which are shown as secured to a plate 33 attached to the frame members 1 and 2. A bracket is shown at 34 and may be provided with suitable means for supporting the pivot 13 for the casing 12. The motor 9 is shown as arranged centrally of the housing 31 adjacent the rear axle to which it may be connected by suitable worm and gear or other connection. The differential gearing 37 is shown as arranged centrally of the drive wheels 3, 3, and in this position may be straddled by the link members 20 and 21 of the toggle. The T 25 which connects the intermediate link of the toggle to the pull rod is shown as located above the differential housing, motor 9 and casing 31. It will be noted that this arrangement of motor drive and load lifting apparatus provides compactness, simplicity and effective strength for resisting the lifting and load strains.

The operation of the device is as follow:—The operator moves the truck to bring the arms 17 under the load to be moved and this done, he operates the controller causing the motor 10 to move the rod to the rear, this movement causes the toggle device 20, 21, to buckle or contract, drawing upwardly on the load carrying arms 17, whereby the load is lifted and may be moved to the desired place. A reversal of the motor allows the extension of the toggle, lowering the load so that it may be deposited where desired.

Having thus described my invention, I claim:

1. In a truck, the combination of a frame, a tilting support adapted to be projected beneath and pick up a load, a toggle, one link of which is connected to said tilting member and the other link to said frame, a pull rod connected to said links, a screw connected with said pull rod and means for operating said screw.

2. In a truck, the combination of a frame, a titlting support adapted to be projected beneath and pick up a load, a toggle, one link of which is connected to said tilting member and the other link to said frame, a pull rod connected to said links and a motor-actuated screw connected with said pull rod.

3. In a truck, a frame, front and rear axles therefor, a load carrying member pivoted to the truck adjacent the center of the frame and projecting beyond one of said axles, a link pivoted to said load carrying member, a second link pivoted to the frame adjacent one axle, a common pivot pin for said two links, whereby they form a toggle, and means to operate said toggle.

4. In a truck, a frame, a tiltable load support pivoted to the frame, a link pivoted to the frame, a second link pivoted to the load support, a common means to which said links are attached, and additional means operating through said first mentioned means and the support to elevate the load.

5. In a self-propelled truck, a frame, front and rear axles supported by said frame, a load carrying member pivoted adjacent the center of said frame, said load carrying member having an upright extending therefrom, a brace for said upright, a bracket on said frame arranged adjacent said load carrying member, a link pivotally connected to said bracket, a second link pivotally engaging said load carrying member, a pivot pin coupling said links together, and a pull rod adapted to actuate said links to operate said load lifting member.

6. In a self-propelled truck, a frame, front and rear axles supported by said frame, a load carrying member pivoted adjacent the center of said frame, said load carrying member having an upright extending therefrom, a brace for said upright, a bracket on said frame arranged adjacent said load carrying member, a pair of links pivotally connected to said bracket, one at each side of the frame, a second pair of links pivotally connected to said load carrying member, a single pivot pin coupling said pairs of links together, and a pull rod connected to said pin and adapted to actuate said links to operate said load lifting member.

In testimony whereof I hereunto affix my signature.

CLYDE E. COCHRAN.